June 20, 1933.　　　J. MAINLAND ET AL　　　1,914,698

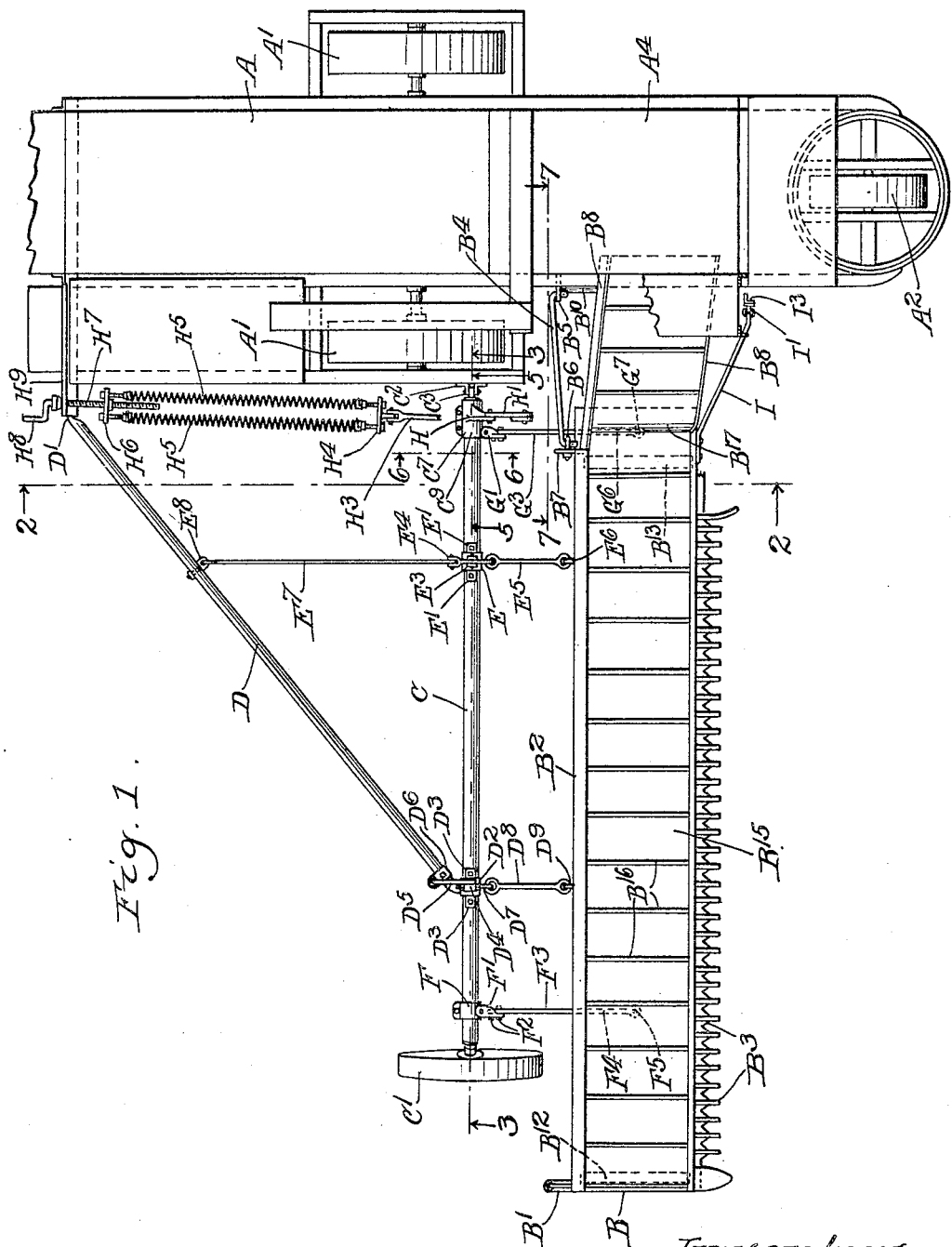

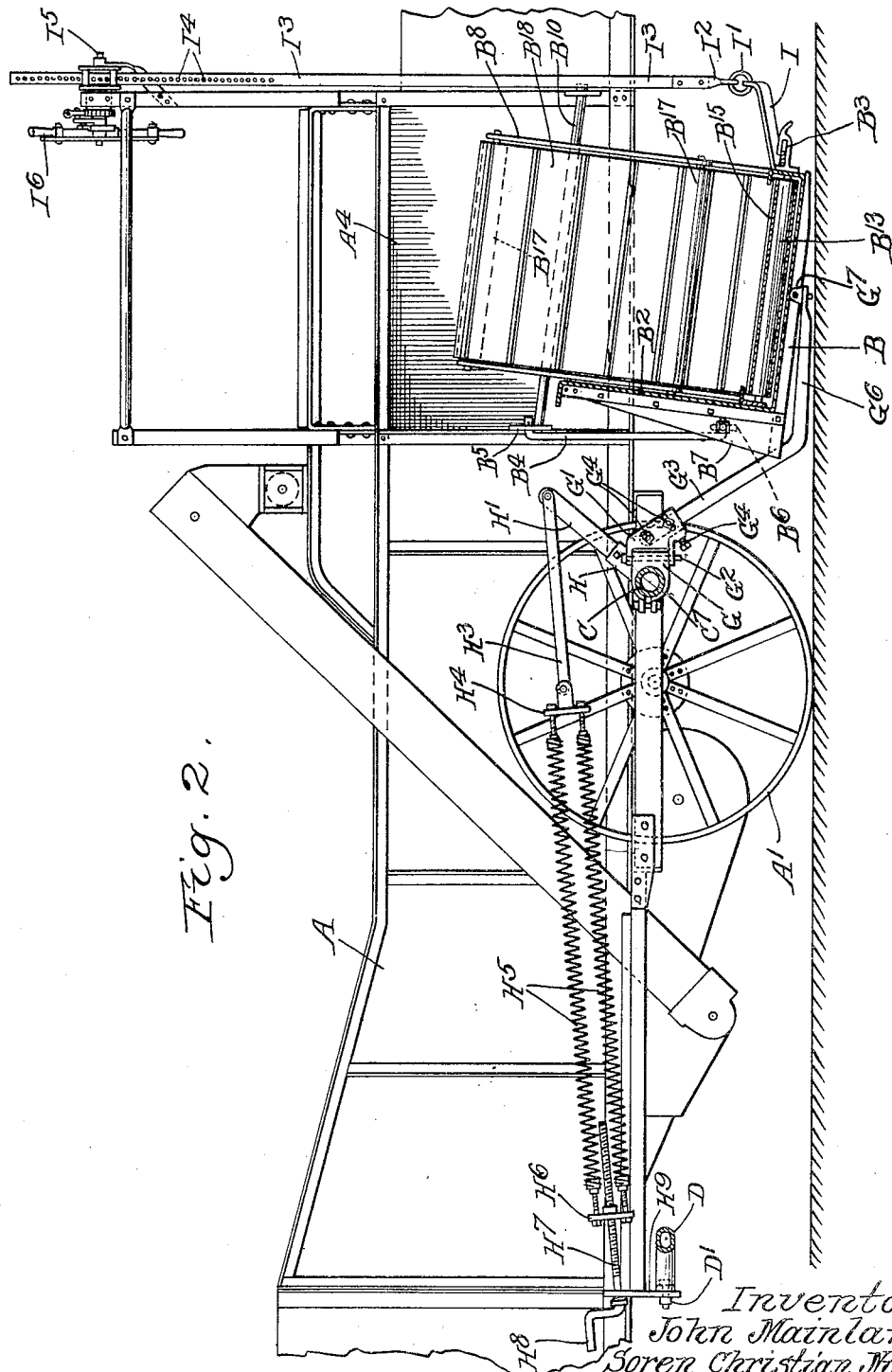

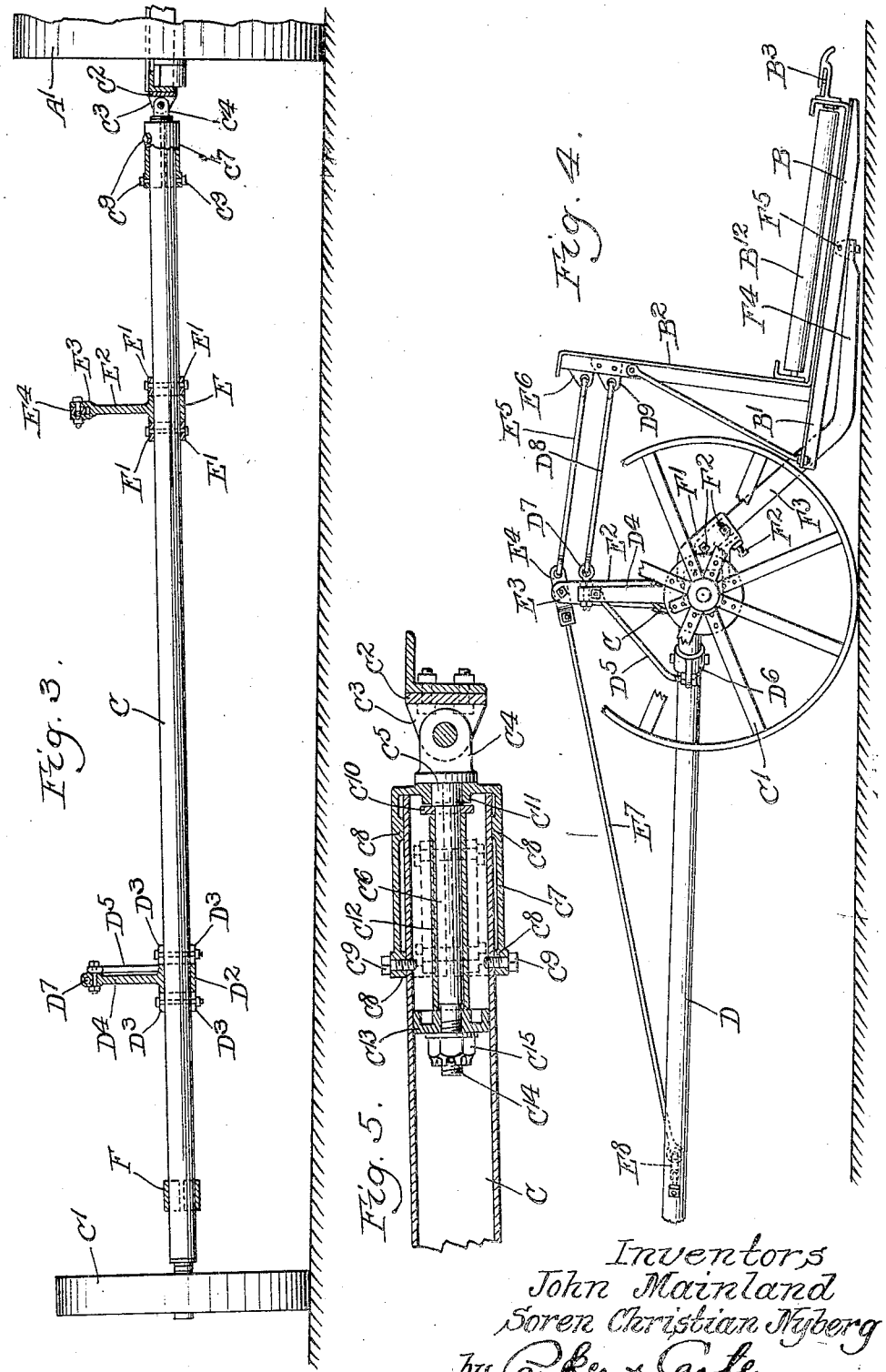

HEADER SUPPORT

Filed March 9, 1931　　　4 Sheets-Sheet 4

Inventors
John Mainland
Soren Christian Nyberg
by Parker & Carter,
Attorneys.

Patented June 20, 1933

1,914,698

UNITED STATES PATENT OFFICE

JOHN MAINLAND AND SOREN CHRISTIAN NYBERG, OF LA PORTE, INDIANA, ASSIGNORS, BY MESNE ASSIGNMENTS, TO ALLIS-CHALMERS MANUFACTURING COMPANY, A CORPORATION OF DELAWARE

HEADER SUPPORT

Application filed March 9, 1931. Serial No. 521,191.

This invention relates to a grain gathering mechanism and particularly to an assembly which severs, collects and conveys the grain to a point of discharge. In the form illustrated, the invention is applied to a combine in which a separating or threshing mechanism is embodied. The grain severing and collecting means, in the form illustrated, is intended mainly for use as a header, although it may be otherwise used. In the specification, for purposes of simplicity, we will refer to the grain collecting and severing mechanism as a header assembly, although it will be understood that by this phrase we do not mean to limit ourselves to a header, as the device of this invention may be used to sever the entire grain stalk as well as the head and it may, of course, be used for cutting any form of grain or grass.

One object of the invention is to provide a header mechanism in which the header may be adjustable in height above the ground. Another object is to provide means for compensating for the vertical adjustment of the header. Another object is to provide means for positively locating the conveyors and for preventing their displacement because of adjustment in the position of the header.

Other objects will appear from time to time in the specification and claims.

My invention is illustrated more or less diagrammatically in the accompanying drawings, wherein—

Figure 1 is a plan view of a combine to which my device has been applied, with parts broken away;

Figure 2 is a longitudinal vertical cross section, taken at line 2—2 of Figure 1;

Figure 3 is a transverse vertical fragmentary cross section, taken at line 3—3 of Figure 1;

Figure 4 is an end view of the header;

Figure 5 is a transverse vertical sectional detail on an enlarged scale, taken at line 5—5 of Figure 1;

Like parts are designated by like characters throughout the specification and drawings.

Figure 7:
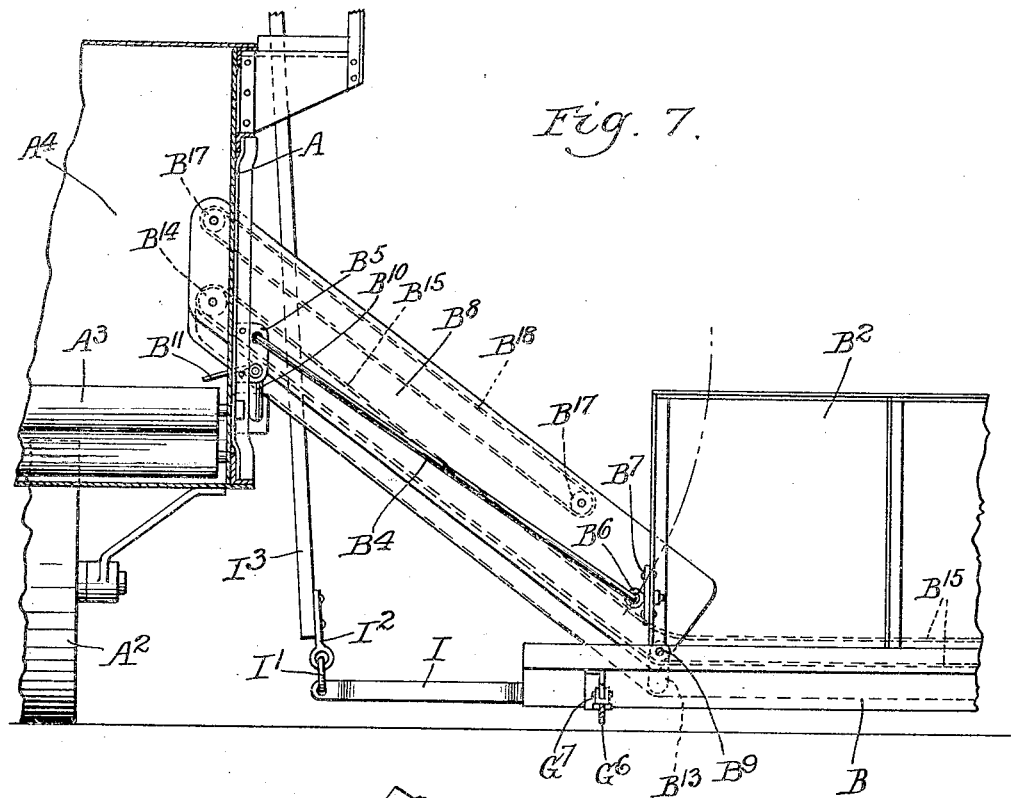
Figure 7 is a transverse vertical cross sectional detail, taken at line 7—7 of Figure 1, on an enlarged scale.

A is a combine. It may be supported on wheels $A^1$ and is provided with a steering wheel $A^2$. The combine includes a conveyor $A^3$ located in communication with a space $A^4$ into which the header conveyor may discharge. The details of the combine will not be further described as they form no essential part of the present invention. Our header mechanism may be applied to any form of combine.

The header assembly includes an extended frame B, which may have one or more rearwardly projecting members $B^1$ and which has a rear wall $B^2$, which is provided with suitable stiffening or bracing members. The header frame is thus a stiff extended frame which carries a conveyor and other parts. Along the forward edge of the header assembly is positioned a sickle bar device $B^3$ which may be of any suitable design and driven in any convenient manner. It serves to sever the grain or other material which the header assembly is collecting. At its inner end, that is to say, at the end adjacent the combine, the header frame is connected to the combine by one or more radius rods $B^4$, the rod being pivoted at its upper end in a member $B^5$ which is mounted on the combine frame and being pivoted at its lower end in an eye $B^6$, which is supported on a bracket $B^7$ which is itself fastened to any suitable part of the header frame. In the form illustrated, it is fastened to the rear wall $B^2$ of the header frame. Actually it might be in any convenient location. A conveyor frame $B^8$ extends from the header frame B upwardly to the combine and is preferably pivoted to the header frame as at $B^9$ and extends into the space $A^4$ in the combine, so that it may discharge into the combine at that point and upon the conveyor $A^3$. A bar $B^{10}$, positioned adjacent the opening in the wall of the combine through which the frame $B^8$ projects, supports the frame and serves as an anti-friction member at that point. Adjacent the member $B^{10}$ and projecting into the space $A^4$ and serving as a guide, is an apron member $B^{11}$, which overlies preferably a portion of the edge of the conveyor $A^3$ and serves to guide material which is discharged into the combine. Located adjacent the outer end of the header frame B is a pulley $B^{12}$. Located adjacent the inner end of the frame B is a second pulley $B^{13}$ and located adjacent the upper end of the conveyor frame $B^8$ is a third pulley $B^{14}$. A conveyor belt $B^{15}$ is provided with slats $B^{16}$ and extends about the pulley just mentioned and serves to convey material which has been deposited upon the header across the frame B, upwardly along the frame $B^8$ and into the combine and upon the conveyor $A^3$. The means for operating the sickle bar are not shown, as these operating means form no particular part of the present invention. Any means which causes satisfactory operation may be used. Positioned within the frame $B^8$ are two pulleys $B^{17}$, $B^{17}$. A belt $B^{18}$ extends about them and between them and is driven in any suitable manner. The conveyor belt $B^{18}$, being mounted above the belt $B^{15}$, cooperates with it and the material which is being conveyed passes between the two conveyors.

Figure 6:
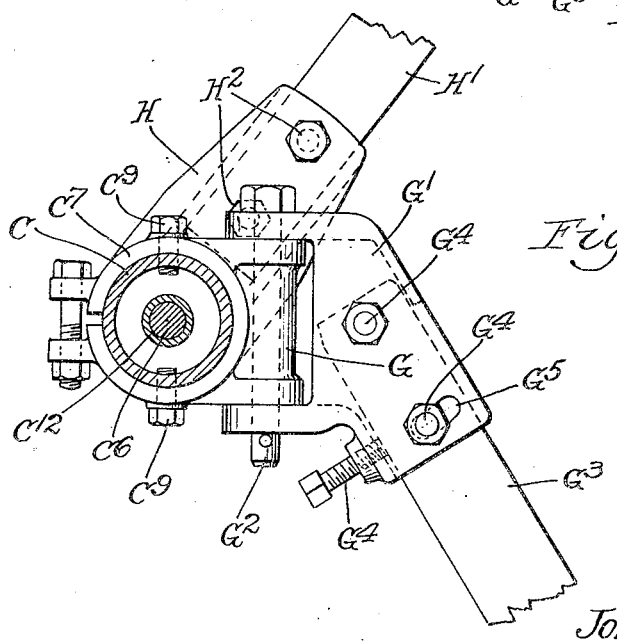
Figure 6 is a longitudinal vertical fragmentary cross section, taken at line 6—6 of Figure 1, on an enlarged scale.

As a means for carrying the header assembly, we provide a laterally extended member C. At its outer end the member C carries a supporting wheel $C^1$. At its inner end it is supported from a portion of the combine frame, upon which a bracket $C^2$, having ears $C^3$, is positioned. Between the ears $C^3$ is journaled a member $C^4$. Extending from the member $C^4$ and preferably formed integrally with it, is a shaft $C^5$ which has a reduced relatively elongated portion $C^6$. Positioned upon the shaft $C^5$ is a split cup-shaped engaging member $C^7$, as shown in Figures 5 and 6, which is provided with spacing lands $C^8$, one of such lands being adjacent its inner end and the other being adjacent its outer end. In these lands $C^8$ there are provided one or more screws $C^9$. The member C, which in this form of the invention is a hollow shaft, is positioned within the cup-shaped member $C^7$ and about the shaft $C^5$ $C^6$ and is preferably seated against the inner end of the cup. It is perforated to receive the screws $C^9$. A washer or spacer $C^{10}$ may be positioned about the shaft $C^6$ to bear against the shoulder formed between the portions $C^5$ and $C^6$ and to clear the inwardly projecting portion $C^{11}$ of the cup $C^7$. Positioned about the shaft $C^5$ and against the spacer $C^{10}$ is a spacer tube $C^{12}$. A retaining member $C^{13}$, which is of such size as to fit snugly within the tube C and to serve as a bearing for it, is positioned upon a further reduced portion $C^{14}$ of the shaft $C^5$ and is held in position thereon by a nut $C^{15}$. There is thus provided for the inner end of the tubular member C a seat which provides a bearing space on the shaft portion $C^5$ and on the member $C^{13}$ and in which the cup $C^7$ is fastened to the tube C so that they rotate as a unit.

Extending rearwardly from the member C is a brace D which, at its rear end as at $D^1$, is fastened to any suitable point on the combine frame and at its forward or outer end is fastened to the member C. At this end it is provided with a ring-like portion $D^2$ which loosely surrounds the member C and is held against lateral displacement by spacing members $D^3$, $D^3$, which are bolted or screwed to the member C as shown. Extending upwardly from the ring portion $D^2$ is a member $D^4$. A relatively short bracing rod $D^5$ extends downwardly and rearwardly from a point adjacent the upper end of the member $D^4$ and at its lower end is fastened to a collar $D^6$ which is preferably bolted in position about the bracing member D. Positioned in the upper end of the member $D^4$ is an eye bolt $D^7$. Extending forwardly from this eye bolt is a link $D^8$ which at its forward end is fastened to a bracket $D^9$ which is positioned on the rear wall $B^2$ of the header frame B.

E is a ring generally similar to the member $D^2$, loosely positioned about the member C and held against longitudinal movement by stops $E^1$ $E^1$ which are bolted or screwed in position, as shown particularly in Figures 1 and 3. Extending upwardly from the ring E and preferably formed integrally with it, is a strut or member $E^2$ which is forked at its upper end as at $E^3$, as shown in Figure 3. Pivoted within the fork $E^3$ is a relatively short link $E^4$. At the forward end of the link $E^4$ is fastened a rod $E^5$ which has its own forward end fastened to a bracket $E^6$, which is fastened to the header frame or to the rear wall $B^2$ of the header frame. Extending rearwardly from the link $E^4$ is a guy member $E^7$ which has its own rear end fastened to the brace D as at $E^8$.

Adjustably positioned upon and preferably adjacent the outer end of the member C is a clamp ring F. This ring may be clamped to the member C in any suitable position of adjustment. Extending preferably downwardly and forwardly from the clamp ring F is a vertically pivoted socket portion $F^1$, within which a socket is formed to receive the frame supporting member. $F^2$ $F^2$ are attaching and adjusting screws positioned in the socket member $F^1$ and by means of which a support member may be held in position and adjusted within the socket. $F^3$ is a header frame supporting member having its upper and rear end socketed in the member $F^1$ and fastened therein adjusted position by means of the screws $F^2$. A portion $F^4$ of the member $F^3$ is inclined with relation to the first mentioned portion of the member and normally occupies a position more or less parallel to the surface over which the header is being moved. At its forward end the member $F^4$, through a universal bearing $F^5$, supports one end of the frame B.

Formed upon the split cup-shaped member $C^7$ and preferably formed integrally with it, is a perforated bearing member G, upon which is pivotally supported a socket member $G^1$, $G^2$ being a pivot pin which is adapted to hold the parts in position as indicated in Figure 6. A header frame supporting member $G^3$, generally similar to the member $F^3$, is mounted within the socket portion $G^1$ and held in position therein by adjusting and fastening screws $G^4$ $G^4$. The socket $G^1$ is provided with one or more slots $G^5$ to assist in the adjustment of the position of the member $G^3$ within the socket. $G^6$ is a forward and downward portion of the member $G^3$, which is angularly disposed with respect to it and which carries at its forward or outer end a universal bearing $G^7$ by means of which it supports the header frame adjacent its inner end.

Formed also on the member $C^7$ and formed preferably integrally with it, is a second socket member H, which preferably extends upwardly at an angle as indicated in Figures 2 and 7. This member is not pivoted with relation to the portion $C^7$ and within it is seated a lever $H^1$ which is held in position by one or more screws $H^2$ $H^2$. Adjacent its upper end a link $H^3$ is pivotally fastened at one end to the lever $H^1$. At its opposite end the link is connected to a saddle member $H^4$ to which one or more springs $H^5$ are fastened. At their opposite ends the springs $H^5$ are fastened to a saddle member $H^6$ which is provided with a threaded perforation to engage an adjusting screw $H^7$, which carries, at its outer end, an operating handle $H^8$, and is mounted in a fixed support $H^9$. By means of this construction tension on the springs may be varied. The details of mounting of the downwardly extending vertically pivoted socket member $F^1$ are essentially the same as are those of the corresponding member $G^1$, illustrated in detail in Figure 6.

I is a header frame supporting bar, which may be attached adjacent the inner end of the header frame and which is forwardly inclined from its point of attachment on the frame, as indicated particularly in Figures 1 and 2. At its free end the bar I is perforated and carries a ring $I^1$. The ring is fastened to a member $I^2$ which is itself fastened to an adjusting bar $I^3$. Toward its upper end the bar $I^3$ is provided with perforations $I^4$ which are engaged by teeth in a sprocket wheel carried on a shaft $I^5$. When the shaft is rotated so as to rotate the sprocket wheel, the member $I^3$ is moved up or down in accordance with the direction of rotation and the header frame is thus adjusted upwardly or downwardly. The details of the adjustment, the sprocket wheel and the associated parts are not shown, as they form no particular part of the present invention. It is sufficient that means be provided for moving the bar $I^3$ up and down and thus for swinging the header frame up or down. The shaft $I^5$, which carries the sprocket which engages the perforations $I^4$ of the member $I^3$, is rotated by a hand wheel $I^6$. These parts are supported from a frame extending upwardly from the combine.

It will be realized that whereas we have herewith shown and described a practical operative device, nevertheless many changes might be made in the size, shape, number and disposition of parts, without departing materially from the spirit of our invention and we wish, therefore, that our showing be taken as in a sense diagrammatic.

The use and operation of this invention are as follows:

The device may be used as a header and when so used will be adjusted above the ground a suitable distance to correspond with the height of the heads of grain above the ground, so that as the machine is moved through the field the heads of the grain are severed by the sickle bar, are dropped onto the conveyor $B^{15}$ and moved toward the combine and up upon the conveyor $B^{15}$ and below the conveyor $B^{18}$, through the opening in the side of the combine, into the space $A^4$ and deposited upon the conveyor $A^3$. This path which the grain takes is the same, no matter what the position of adjustment of the header frame above the ground. The header frame, of course, can be so adjusted with respect to the ground and to the grain that it does not act as a header but cuts not merely the heads of the grain but the entire stalk.

When for any reason it is found necessary to adjust the height of the header frame assembly above the ground, the shaft $I^5$ is rotated by means of the hand wheel $I^6$, or otherwise, and the member $I^3$ is moved upward or downward, as the case may be. As it moves upward it raises the header frame. Since the members $G^3$ and $F^3$, which support the header frame from the tubular member C, are fixed to that member, if the frame is rotated up or down the member C rotates correspondingly. The ring members $D^2$ and E, which are loosely positioned upon the member C, do not rotate with that member. Since the header frame B is joined to the combine by a radius rod $B^4$, raising or lowering of the frame B causes movement toward or away from the header. This movement is made possible by reason of the fact that the sockets which receive the members $F^3$ and $G^3$ are vertically pivoted for lateral swinging and for the further fact that the links $D^8$ and $E^5$ are similarly pivoted for lateral swinging. Thus as the header frame assembly is adjusted up or down, it swings out or in with respect to the combine and the supporting members, which carry the header frame B from the member C, swing laterally. This swinging movement is controlled by the radius rod B⁴ and by reason of this construction, the conveyor frame B⁸ and the conveyor parts which it carries, do not move into or out of the space A⁴ or the combine. The angle of inclination of the frame B⁸ and the conveyor portions which it carries will be changed with vertical adjustment of the header assembly, but the position of the upper end of the conveyor with respect to the combine will not be varied.

We claim:

1. In combination with a combine, a header assembly, a conveyor extending between the header and the combine, and means for adjusting such header assembly vertically with respect to the ground while insuring a restricted movement of the discharge end of said conveyor, said means comprising a radius link fastened to the combine and to the header, and adapted to hold the header to a fixed radius of motion, irrespective of its position above the ground.

2. In combination with a combine, a header assembly, a support laterally extending from said combine and on which said header is adjustably supported, a conveyor frame extending between the header and the combine and means for adjusting such header assembly vertically with respect to the ground while restricting movement of the discharge end of said conveyor, said means comprising a radius link fastened to the combine and to the header, and adapted to hold the header to a fixed radius of motion, irrespective of its position above the ground.

3. In combination with a combine, a header assembly, means for adjusting such header assembly vertically with respect to the ground, a conveyor extending between the header and the combine and having its discharge end projecting into the combine, and means for maintaining a substantially fixed position of the discharge end of said conveyor irrespective of the position of vertical adjustment of said header, said means comprising a radius link fastened to the combine and to the header, and adapted to hold the header to a fixed radius of motion, irrespective of its position above the ground.

4. In combination with a combine, a header assembly, means for adjusting such header assembly vertically with respect to the ground, a conveyor extending between the header and the combine and projecting into the combine, and means for limiting the amount of projection of the conveyor into the combine, said means comprising a radius link fastened to the combine and to the header.

5. In combination with a combine, a header assembly, means for raising and lowering the header with respect to the ground, a conveyor positioned along the header and conveying means from the header to the combine, and means for positioning an end of said last mentioned conveying means with respect to the combine and for holding such conveying means within a limited range of movement, irrespective of the position of the header.

6. In combination with a combine, a header assembly, means for raising and lowering the header with respect to the ground, a conveyor positioned along the header and conveying means from the header to the combine, and means for positioning an end of said last mentioned conveying means with respect to the combine and for holding such conveying means within a limited range of movement, irrespective of the position of the header, such means comprising a radius link attached to the header and to the combine.

7. In combination with a grain treating machine, having a housing, a grain conveying assembly, provided with means for conveying grain laterally into said machine, the grain conveying assembly mounted for vertical adjusting movement, and means for providing a fixed radius of movement of the end of the grain conveying assembly with respect to the machine.

8. In combination with a grain treating machine, having a housing, a grain conveying assembly supported from said machine and provided with means for conveying grain laterally into said machine, the grain conveying assembly mounted for vertical adjusting movement, and means for providing a fixed radius of movement of the end of the grain conveying assembly with respect to the machine.

9. In combination with a grain treating machine, having a housing, a grain conveying assembly supported from said machine and provided with means for conveying grain laterally and upwardly into said machine, the grain conveying assembly mounted for vertical adjusting movement, and means for providing a fixed radius of movement of the end of the grain conveying assembly with respect to the machine.

10. In combination with a grain treating machine, having a housing, a grain conveying assembly provided with means for conveying grain laterally into said machine, the grain conveying assembly mounted for vertical adjusting movement and a radius member connecting the machine with the grain conveying assembly, and providing a fixed radius of movement of the end of the grain conveying assembly with respect to the machine.

11. In combination with a combine, a header, means for adjusting the header vertically with respect to the combine, a support for the header, said support comprising an extending member, supporting parts extending from said member to the header, said supporting parts movably mounted with relation to the extending member and adapted to permit movement of the header with respect to said member.

12. In combination with a combine, a header, means for adjusting the header vertically with respect to the combine, a support for the header, said support comprising an extending member, supporting parts extending from said member to the header, said supporting parts movably mounted with relation to the extending member and adapted to permit longitudinal movement of the header with respect to said member.

13. In combination with a combine, a header, means for adjusting the header vertically with respect to the combine, a support for the header, joined to the combine, said support comprising an extending member, supporting parts extending from said member to the header, said supporting parts movably mounted with relation to the extending member and adapted to permit movement of the header with respect to said member.

14. In combination with a combine, a header, means for adjusting the header vertically with respect to the combine, a support for the header, joined to the combine, said support comprising an extending member, supporting parts extending from said member to the header, said supporting parts movably mounted with relation to the extending member and adapted to permit longitudinal movement of the header with respect to said member.

15. In combination with a combine, a header, means for adjusting the header vertically with respect to the combine, a support for the header, said support comprising an extending member, supporting parts extending from said member to the header, said supporting parts movably mounted with relation to the extending member and adapted to permit movement of the header with respect to said member, and a radius link fastened to the header and to the combine.

16. In combination with a combine, a header, means for adjusting the header vertically with respect to the combine, a support for the header, said support comprising an extending member, supporting parts extending from said member to the header, said supporting parts movably mounted with relation to the extending member and adapted to permit longitudinal movement of the header with respect to said member, and a radius link fastened to the header and to the combine.

17. In combination with a combine, a header, means for adjusting the header vertically with respect to the combine, a support for the header, joined to the combine, said support comprising an extending member, supporting parts extending from said member to the header, said supporting parts movably mounted with relation to the extending member and adapted to permit longitudinal movement of the header with respect to said member, and a radius link fastened to the header and to the combine, to limit the path of movement of the header with respect to the combine.

18. In combination with a grain treating machine, a header assembly, means for adjusting the header vertically with respect to the machine, a support for the header, extending laterally from the machine, a plurality of carrying parts carrying the header from said support, all of said carrying parts mounted for swinging about generally vertical axes.

19. In combination with a grain treating machine, a header assembly, means for adjusting the header vertically with respect to the machine, a support for the header, extending laterally from the machine, a plurality of carrying parts carrying the header from said support, all of said carrying parts mounted for swinging about generally vertical axes, and means for confining the movement of the end of the header to a predetermined path with respect to the machine.

20. In combination with a grain treating machine, a header assembly, means for adjusting the header vertically with respect to the machine, a support for the header, extending laterally from the machine, a plurality of carrying parts carrying the header from said support, all of said carrying parts mounted for swinging about generally vertical axes, and means for confining the movement of the end of the header to a predetermined path with respect to the machine, said means including a radius member, mounted on the header and on the machine.

Signed at La Porte, county of La Porte and State of Indiana, this 20th day of February, 1931.

JOHN MAINLAND.
SOREN CHRISTIAN NYBERG.